Aug. 15, 1944.        J. P. LAWLOR        2,355,808
REMOVAL OF MANGANESE FROM WATER
Filed Nov. 5, 1941
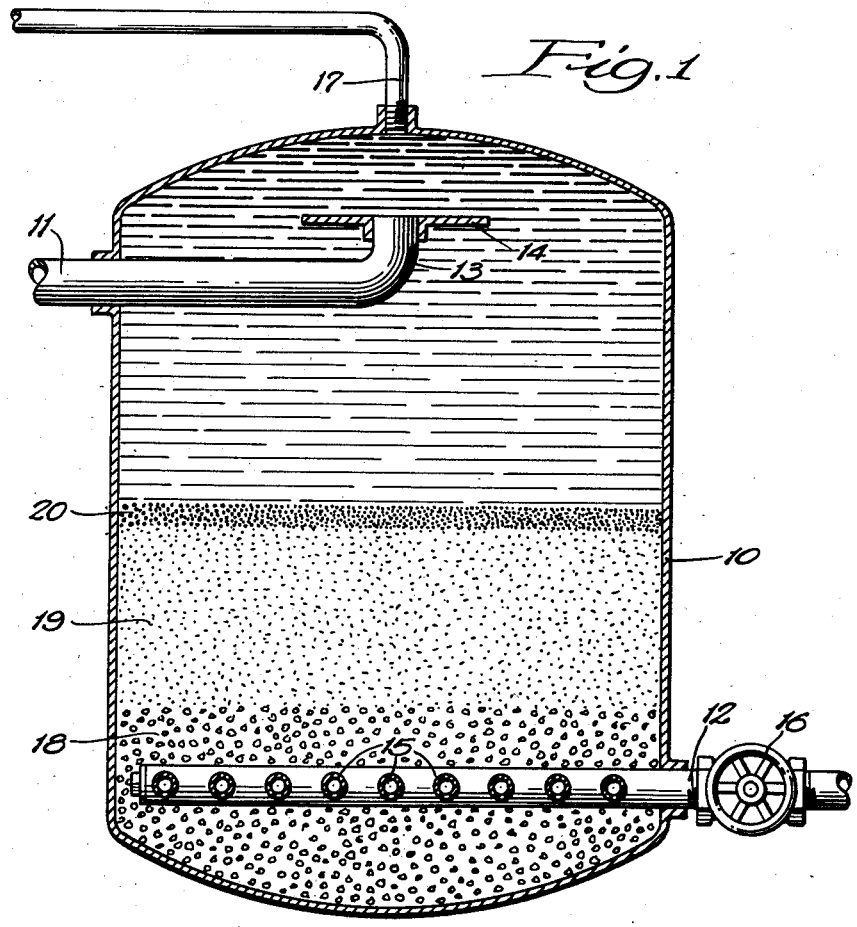
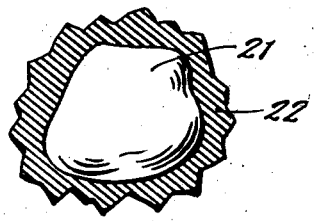

Patented Aug. 15, 1944

2,355,808

UNITED STATES PATENT OFFICE 2,355,808

REMOVAL OF MANGANESE FROM WATER

Joseph P. Lawlor, Ames, Iowa

Application November 5, 1941, Serial No. 417,909

3 Claims. (Cl. 210—16)

This invention relates to the removal of manganese from water and more particularly to a bed of manganese removal material and a method of preparing the same.

The presence of manganese compounds in water, at least in any substantial quantity, has long been considered undesirable. Such compounds tend to form oxides and hydroxides of manganese which are insoluble in water and are deposited in water mains and pipes. Manganese deposits of this character are difficult to remove from the water pipe and often occasion great difficulty in this manner. Moreover, the manganese compounds, when precipitated as insoluble oxides, are usually black and tend to color articles which are placed in the water. In addition, if present in sufficient quantities, the manganese compounds will appreciably affect the taste of the water.

The manganese compounds, when converted to an insoluble form, provide a precipitate which is so finely divided that it will pass through the ordinary filter bed which may be used for removing iron and the like. Various methods for removal of manganese compounds from water have heretofore been devised. Treatment of the water with chemicals has often been used. Special filtration systems have also been used in conjunction with means for converting the manganese compounds into an insoluble form. The use of chemicals to precipitate the manganese, for removal by filtration, increases the operating cost.

An object of the present invention is to provide a filter which is adapted to remove iron and other suspended materials from water and, at the same time, effectively remove manganese therefrom. Another object is to provide a filter in which an inexpensive filtering material such as sand may be rapidly converted into an effective material for removing manganese deposits from the water. Still another object is to quickly form on grains or granules of sand and the like a coating of a manganese deposit. Another object is to provide a material, within a filter bed, that will remove manganese by contact with said material without the addition of chemicals.

Other features and advantages will appear from the following specification and drawing in which—

Figure 1 is a vertical sectional view of a filter prepared in accordance with the invention; and Fig. 2 is a detail view in section of one of the grains of sand showing the coating of manganese thereon.

In the specific embodiment of the invention described herein, a filter tank or container 10 is equipped with an inlet 11 in the upper portion thereof an and outlet 12 in the lower portion of the tank. The inlet 11 is preferably turned upwardly at 13 in the center of the tank to provide for the upflow of the water into the tank. If desired, an annular baffle 14 may be disposed about the end of the inlet pipe.

The outlet pipe 12 is preferably equipped with a plurality of openings 15 which receive the water from the lower portion of the tank and may also be provided with a suitable valve 16 for controlling the flow of water therethrough. A riser 17 of the conventional type may be provided at the upper portion of the tank for use in removing air from the water.

The tank 10 is preferably provided with a layer 18 of gravel in the lower portion thereof. On the layer 18 of gravel is received a layer 19 of filtering material such as sand and the like. This layer 19 in turn receives a smaller layer 20 of granular filter material such as sand wherein the grains of filter material are coated with an insoluble manganese compound such as manganese dioxide. If desired, the grains of filter material in the layer 20 may be introduced into the layer 19 and mixed with the filter material of this latter layer. At any rate, the coated grains of the layer 20 should be in contact with the grains of the layer 19.

The manganese deposit which forms a coating on the grains of sand or other filter material of the layer 20 is firmly attached to the grains. As seen in the detail view in Fig. 2, the grain of sand 21 is covered by a layer 22 of manganese dioxide or other insoluble manganese compound. This coating 22 clings very tightly to the sand grain and may not be dislodged therefrom by any ordinary physical action.

The coated sand may be obtained by passing water containing manganese compounds through a sand filter for a long period of time. When this water is passed through a sand filter for a long period of time, for example, for two or three years, a coating of the manganese deposit or precipitate is built up on the grains of sand in the filter bed. These grains of sand, when they comprise substantially the entire filter bed, are effective in removing from the water manganese compounds therein. Such coated grains of sand are then used for the layer 20 which is introduced into the filter tank 10 and disposed on the layer 19 of sand.

When the water containing manganese in the form of finely divided insoluble compounds is passed through the layers 20 and 19 in the tank 10, a small portion of the manganese compounds attaches itself to the sand particles of the layer 19 and a coating of manganese is rapidly formed on the grains of sand in this layer. Ordinarily the manganese coating will be in the form of an insoluble manganese oxide. Within a relatively short period of time, such as one or two months, the grains of sand in the layer 19 will be coated with the manganese deposit and the filter formed by the layers 19 and 20 will be effective to remove substantially all of the manganese compounds from the water. If the coated grains of the sand of the layer 20 were not present and in contact with the grains of sand in the layer 19, this coating would not occur for a long period of time, usually in the neighborhood of two or three years.

The presence of the grains of sand coated with the manganese oxide as found in the layer 20 appears to act as a catalyst in the formation of coated grains in the layer 19. It may be that the grains of sand in the layer 19 receive the manganese deposit from the grains in the layer 20 with which they are in contact rather than from the water. The theory of the reaction is not completely understood. At any rate, it is clear that in the presence of the manganese coated grains of sand of the layer 20, the grains of sand in the layer 19 rapidly accumulate a coating of a manganese deposit and thus form an effective manganese removing material.

The coating of the manganese deposit which accumulates on the grains of sand in the filter is extremely hard and clings very tightly to the sand. The coating which is formed is so stable that backwashing of the filter appears to have little, if any, effect on the coating.

While in the foregoing description various details of structure and method have been set forth for the purpose of illustrating the invention, it will be obvious that many changes and modifications may be readily made therein without departing from the spirit of the invention.

I claim:

1. A method of preparing a bed of a manganese removal material, comprising providing in a filter zone a layer of sand in which the grains thereof are free of any manganese deposit, adding to said layer a smaller layer of sand wherein the grains thereof have been coated with manganese dioxide by the passage therethrough of water containing finely divided particles of a manganese compound suspended therein, the coated grains of sand being in contact with the grains in said first-mentioned layer, and passing through both of said layers water containing finely divided particles of a manganese compound suspended therein to form on the uncoated grains of sand a manganese deposit which increases the efficiency of the bed in removing manganese from water.

2. A method of preparing a bed of a manganese removal material, comprising passing water containing finely-divided particles of a manganese compound suspended therein through sand until the sand particles have received a coating of manganese dioxide, introducing a portion of the sand so prepared onto a layer of sand substantially free of any manganese deposit, and passing water containing finely-divided particles of manganese compound suspended therein through the coated sand particles and the uncoated sand particles free of manganese deposits to form on the uncoated particles a manganese deposit which increases the efficiency of the bed in removing manganese from the water.

3. A method of preparing a bed of a manganese removal material, comprising coating the granular particles of a filter material with manganese dioxide, forming said coated granular particles in a layer adjacent a layer of granular particles of a filter material the granules of which are free of any manganese deposit and in a filter zone, coated particles of said first-mentioned layer being in contact with uncoated particles of said second-mentioned layer, and passing through both of said layers water containing finely-divided particles of a manganese compound suspended therein to form on the uncoated particles of said second-mentioned layer a manganese deposit which increases the efficiency of the bed in removing manganese from water.

JOSEPH P. LAWLOR.